United States Patent
Mittal et al.

(10) Patent No.: US 11,271,860 B1
(45) Date of Patent: Mar. 8, 2022

(54) COMPRESSED TAG COHERENCY MESSAGING

(71) Applicant: XILINX, INC., San Jose, CA (US)

(72) Inventors: Millind Mittal, Saratoga, CA (US); Jaideep Dastidar, San Jose, CA (US)

(73) Assignee: XILINX, INC., San Jose, CA (US)

( * ) Notice: Subject to any disclaimer, the term of this patent is extended or adjusted under 35 U.S.C. 154(b) by 85 days.

(21) Appl. No.: 16/686,067

(22) Filed: Nov. 15, 2019

(51) Int. Cl.
*G06F 15/16* (2006.01)
*H04L 47/2425* (2022.01)
*H04L 49/9057* (2022.01)

(52) U.S. Cl.
CPC ...... *H04L 47/2433* (2013.01); *H04L 49/9057* (2013.01)

(58) Field of Classification Search
CPC . G06F 12/0815; G06F 12/0828; G11C 29/18; H04L 47/2433; H04L 49/9057
USPC .................................................. 370/389
See application file for complete search history.

(56) References Cited

U.S. PATENT DOCUMENTS

| | | | |
|---|---|---|---|
| 6,446,165 B1 * | 9/2002 | Arimilli | G06F 12/0811 711/120 |
| 6,608,813 B1 | 8/2003 | Chiussi et al. | |
| 6,914,907 B1 | 7/2005 | Bhardwaj et al. | |
| 8,422,493 B2 | 4/2013 | Kono et al. | |
| 8,787,374 B2 | 7/2014 | Maeda et al. | |
| 9,306,845 B2 | 4/2016 | Kumagai et al. | |
| 9,391,835 B2 | 7/2016 | Aoshima et al. | |
| 9,525,591 B2 | 12/2016 | Yasuda et al. | |
| 9,794,194 B2 | 10/2017 | Yasuda et al. | |
| 10,097,466 B2 | 10/2018 | Tang et al. | |
| 10,409,743 B1 | 9/2019 | Mittal et al. | |
| 2005/0160132 A1 * | 7/2005 | Van Doren | G06F 12/0831 709/200 |
| 2009/0113140 A1 * | 4/2009 | Quach | G06F 12/0831 711/146 |
| 2013/0311817 A1 * | 11/2013 | Kim | G06F 1/10 713/501 |
| 2014/0095806 A1 * | 4/2014 | Fajardo | G06F 12/0831 711/146 |
| 2014/0112339 A1 * | 4/2014 | Safranek | G06F 9/44505 370/389 |
| 2014/0114928 A1 * | 4/2014 | Beers | G06F 11/3604 707/687 |

(Continued)

OTHER PUBLICATIONS

U.S. Appl. No. 15/967,473, filed Apr. 30, 2018, San Jose, CA USA.

(Continued)

*Primary Examiner* — Robert J Lopata
(74) *Attorney, Agent, or Firm* — Patterson + Sheridan, LLP

(57) ABSTRACT

An example cache-coherent packetized network system includes: a home agent; a snooped agent; and a request agent configured to send, to the home agent, a request message for a first address, the request message having a first transaction identifier of the request agent; where the home agent is configured to send, to the snooped agent, a snoop request message for the first address, the snoop request message having a second transaction identifier of the home agent; and where the snooped agent is configured to send a data message to the request agent, the data message including a first compressed tag generated using a function based on the first address.

20 Claims, 13 Drawing Sheets

(56) References Cited

U.S. PATENT DOCUMENTS

| | | | |
|---|---|---|---|
| 2014/0173248 A1* | 6/2014 | Varma | G06F 9/3885 |
| | | | 712/30 |
| 2017/0235695 A1* | 8/2017 | Blankenship | G06F 13/161 |
| | | | 710/313 |
| 2018/0287964 A1 | 10/2018 | Gray | |

OTHER PUBLICATIONS

U.S. Appl. No. 16/025,762, filed Jul. 2, 2018, San Jose, CA USA.
U.S. Appl. No. 16/053,384, filed Aug. 2, 2018, San Jose, CA USA.
U.S. Appl. No. 16/141,704, filed Sep. 25, 2018, San Jose, CA USA.
U.S. Appl. No. 16/053,488, filed Aug. 2, 2018, San Jose, CA USA.
U.S. Appl. No. 16/208,260, filed Dec. 3, 2018 San Jose, CA USA.

\* cited by examiner

COMPRESSED TAG COHERENCY MESSAGING

TECHNICAL FIELD

Examples of the present disclosure generally relate to computing systems and, in particular, to compressed tag messaging in cache-coherent packetized networked systems.

BACKGROUND

Server central processing unit (CPU)-accelerator systems are inherently hardware cache-coherent systems. That is, the hardware maintains a universal, coherent view of accessed, modified, and cached data regardless of whether the processor/accelerator is acting as the producer or the consumer of the data and/or metadata. Example cache-coherent systems include those enabled by Compute Express Link (CXL), Cache Coherent Interconnect for Accelerators (CCIX), QuickPath Interconnect (QPI), Ultra Path Interconnect (UPI), Infinity Fabric (IF), NVLink, and OpenCAPI.

Due to the physically distributed nature of these cache-coherent communication networks, and a desire to minimize the physical pin resource requirements, the systems are often packetized. Each packet contains information for the coherent message. Due to the limited transport width, however, the packet is typically formed from packet flits that are time-division multiplexed over the transport width. The larger the number of bits required to communicate the coherent message, the larger the number of packet flits constituting a packet and the longer the latency of communicating a particular message, as well as the aggregate latency of messages, across the transport. The lower the aggregate latency, the higher the aggregate performance of a cache coherent packetized network.

Accordingly, system designers place a premium on minimizing the number of bits required to communicate the coherent message, resulting in lower latency messaging. This also results in greater transport efficiency, considering that a multitude of coherent agents may be simultaneously communicating coherency actions across a multitude of memory locations, all using a common cache coherent packetized network.

SUMMARY

Techniques for compressed tag messaging in cache-coherent packetized networked systems are described. In an example, cache-coherent packetized network system includes: a home agent; a snooped agent; and a request agent configured to send, to the home agent, a request message for a first address, the request message having a first transaction identifier of the request agent; where the home agent is configured to send, to the snooped agent, a snoop request message for the first address, the snoop request message having a second transaction identifier of the home agent; and where the snooped agent is configured to send a data message to the request agent, the data message including a first compressed tag generated using a function based on the first address.

In another example, a method in a cache-coherent packetized network system includes: sending, from a request agent to a home agent, a request message for a first address, the request message having a first transaction identifier of the request agent; sending, from the home agent to the request agent, a snoop request message for the first address, the snoop request message having a second transaction identifier of the home agent; and sending, from the snooped child agent to the request agent, a data message, the data message including a first compressed tag generated using a function based on the first address.

In another example, an agent in a cache-coherent packetized network system includes: a cache memory storing data; and a processing system, coupled to the cache memory, the processing system configured to: send request messages to one or more external agents, each request message having an address associated with data and a transaction identifier of the agent; generate local compressed tags using a function from the addresses in the request messages; and bind received messages with the corresponding request messages by comparing compressed tags in the received messages with the local compressed tags.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Figure 1A:
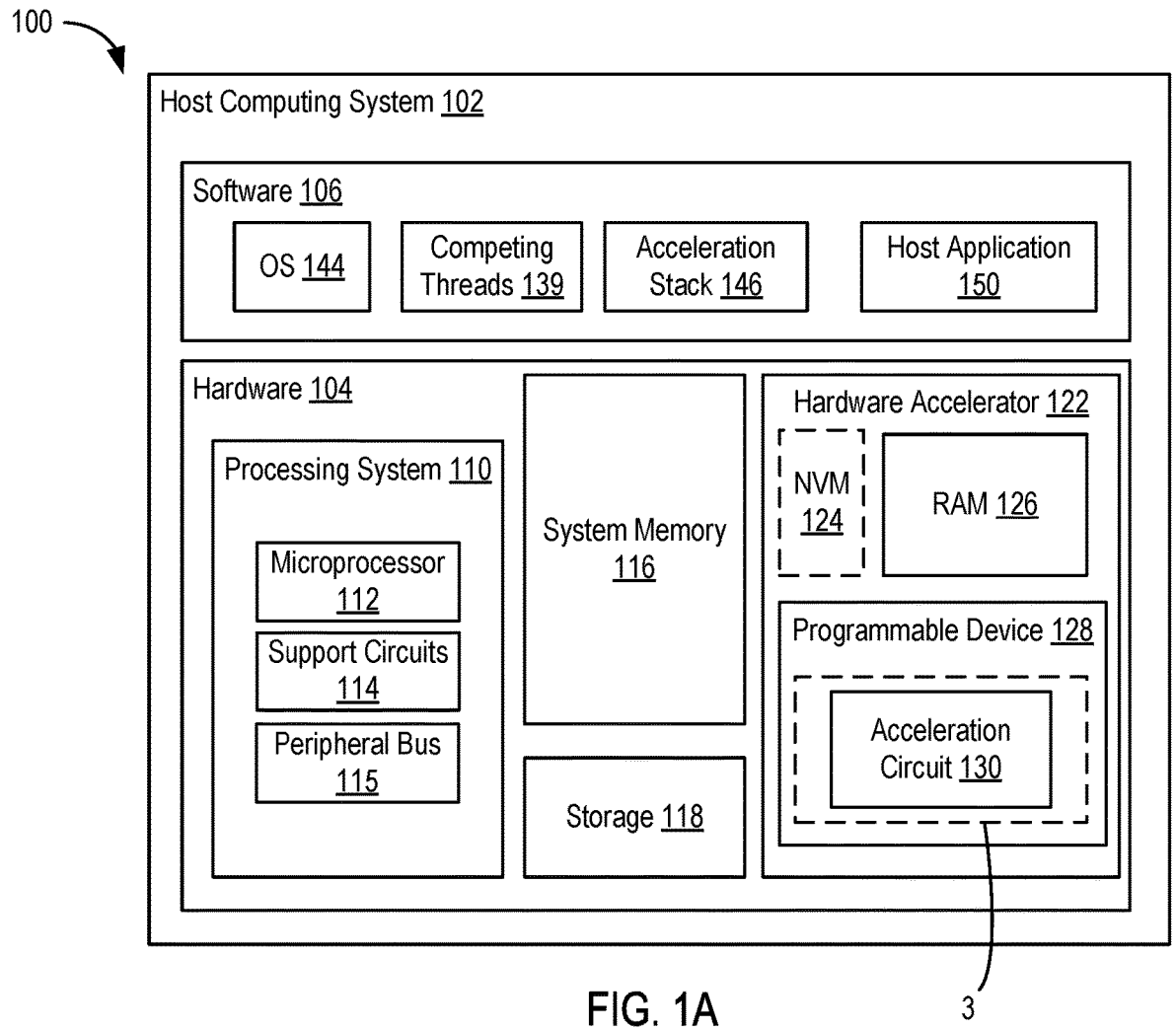
FIG. 1A is a block diagram depicting a hardware acceleration system according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques for compressed tag messaging in cache-coherent packetized networked systems are described. As noted above, system designers place a premium on minimizing the number of bits required to communicate the coherent message. In addition, cache-coherent protocols support a single parent request transaction (i.e., the original CPU/accelerator request to memory) followed by multiple child transactions (e.g., snoop transactions, data transactions, and snoop response transactions). In order to achieve correctness of operation, the collection of coherency agents that perform coherency actions spurred by the parent memory request rely on a reattachment scheme to bind the original parent transaction to the subsequent child response transactions. In summary, cache coherent communication networks are packetized for maximum connectivity over minimum pins; coherency messages being latency sensitive benefit from smaller packets conveying the information; and coherency messages typically involve a parent message that spawns multiple child messages in achieving a certain coherent operation.

Accordingly, examples described herein provide a compressed tag mechanism for cache-coherent packetized networks. The compressed tag enables a cache-coherent agent to reattach a child message to its parent coherent request message, necessary for completion of the coherency operation. The techniques described herein can improve the bandwidth and efficiency of cache-coherent packetized network systems enabled by the various cache-coherent protocols mentioned above (e.g., CCIX, CXL, and the like). These and other aspects are described below with respect to the drawings.

FIG. 1A is a block diagram depicting a hardware acceleration system 100 according to an example. The hardware acceleration system 100 includes a host computing system 102. The host computing system 102 includes a hardware platform ("hardware 104") and a software platform ("software 106") executing on the hardware 104. The hardware 104 includes a processing system 110, system memory 116, storage devices ("storage 118"), and a hardware accelerator 122. The software 106 includes an operating system (OS) 144, an acceleration stack 146, a host application 150, and competing threads 139.

The processing system 110 includes a microprocessor 112, support circuits 114, and a peripheral bus 115. The microprocessor 112 can be any type of general-purpose central processing unit (CPU), such as an x86-based processor, ARM®-based processor, or the like. The microprocessor 112 can include one or more cores and associated circuitry (e.g., cache memories, memory management units (MMUs), interrupt controllers, etc.). The microprocessor 112 is configured to execute program code that perform one or more operations described herein and which can be stored in the system memory 116 and/or the storage 118. The support circuits 114 include various devices that cooperate with the microprocessor 112 to manage data flow between the microprocessor 112, the system memory 116, the storage 118, the hardware accelerator 122, or any other peripheral device. For example, the support circuits 114 can include a chipset (e.g., a north bridge, south bridge, platform host controller, etc.), voltage regulators, firmware (e.g., a basic input-output system (BIOS)), and the like. The support circuits 114 manage data flow between the microprocessor 112 and the peripheral bus 115, to which various peripherals, such as the hardware accelerator 122, are connected. In some examples, the microprocessor 112 can be a System-in-Package (SiP), System-on-Chip (SOC), or the like, which absorbs all or a substantial portion of the functionality of the chipset (e.g., north bridge, south bridge, etc.). The peripheral bus 115 can implement an expansion bus standard, such as Peripheral Component Interconnect Express (PCIe) or the like.

The system memory 116 is a device allowing information, such as executable instructions and data, to be stored and retrieved. The system memory 116 can include, for example, one or more random access memory (RAM) modules, such as double-data rate (DDR) dynamic RAM (DRAM). The storage 118 includes local storage devices (e.g., one or more hard disks, flash memory modules, solid state disks, and optical disks) and/or a storage interface that enables the computing system 102 to communicate with one or more network data storage systems. The hardware 104 can include various other conventional devices and peripherals of a computing system, such as graphics cards, universal serial bus (USB) interfaces, and the like.

In an example, the hardware accelerator 122 includes a programmable device 128 and RAM 126. Examples of the programmable device are described below in FIGS. 9A through 9D. The hardware accelerator 122 can optionally include a non-volatile memory (NVM) 124. The programmable device 128 can be a field programmable gate array (FPGA) or an SOC having FPGA programmable logic along with other embedded subsystems. The NVM 124 can include any type of non-volatile memory, such as flash memory or the like. The RAM 126 can include DDR DRAM or the like. The RAM 126 can be organized into discrete RAM banks 127, as described further below. The programmable device 128 is coupled to the NVM 124 and the RAM 126. The programmable device 128 is also coupled to the peripheral bus 115 of the processing system 110.

The OS 144 can be any commodity operating system known in the art, such as such as Linux®, Microsoft Windows®, Mac OS®, or the like. The acceleration stack 146 includes drivers and libraries that provide application programming interfaces (APIs) to the hardware accelerator 122 for command and control thereof.

Figure 1B:
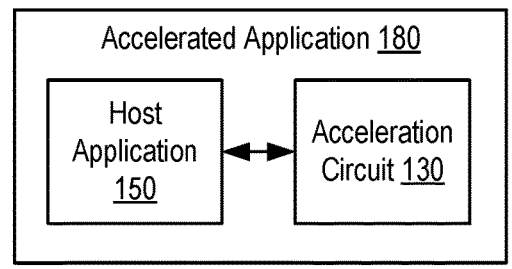
FIG. 1B is a block diagram depicting an accelerated application according to an example.

FIG. 1B is a block diagram depicting an accelerated application 180 according to an example. The accelerated application 180 includes the host application 150 and an acceleration circuit 130. The acceleration circuit 130 is programmed in programmable logic (PL) 3 of the programmable device 128 on the hardware accelerator 122. The host application 150 includes software executing on the microprocessor 112 that invokes the acceleration circuit 130 using API calls to the acceleration stack 146 to perform some work. The host application 150 can include neural network, video processing, network processing, or the like type applications that offload some functions to the hardware accelerator 122.

In the example, the processing system 110 is shown separate from the hardware accelerator 122. In other examples discussed further below, the processing system 110 and the hardware accelerator 122 can be implemented within the same programmable device (e.g., a programmable device with an embedded processing system). In such case, the processing system 110 can utilize alternative interconnects with the PL 3 for communicating with the acceleration circuit 130, examples of which are described below. Further, in the examples discussed herein, the acceleration circuit 130 is implemented in a programmable device 128. In other examples, the programmable device 128 can be replaced by any integrated circuit (IC), including an application specific integrated circuit (ASIC) in which the acceleration circuit 130 comprises hardened circuitry formed therein. Thus, the lock circuit 140 and mutual exclusion scheme discussed herein applies to acceleration circuits in both programmable devices and ASICs.

Figure 2:
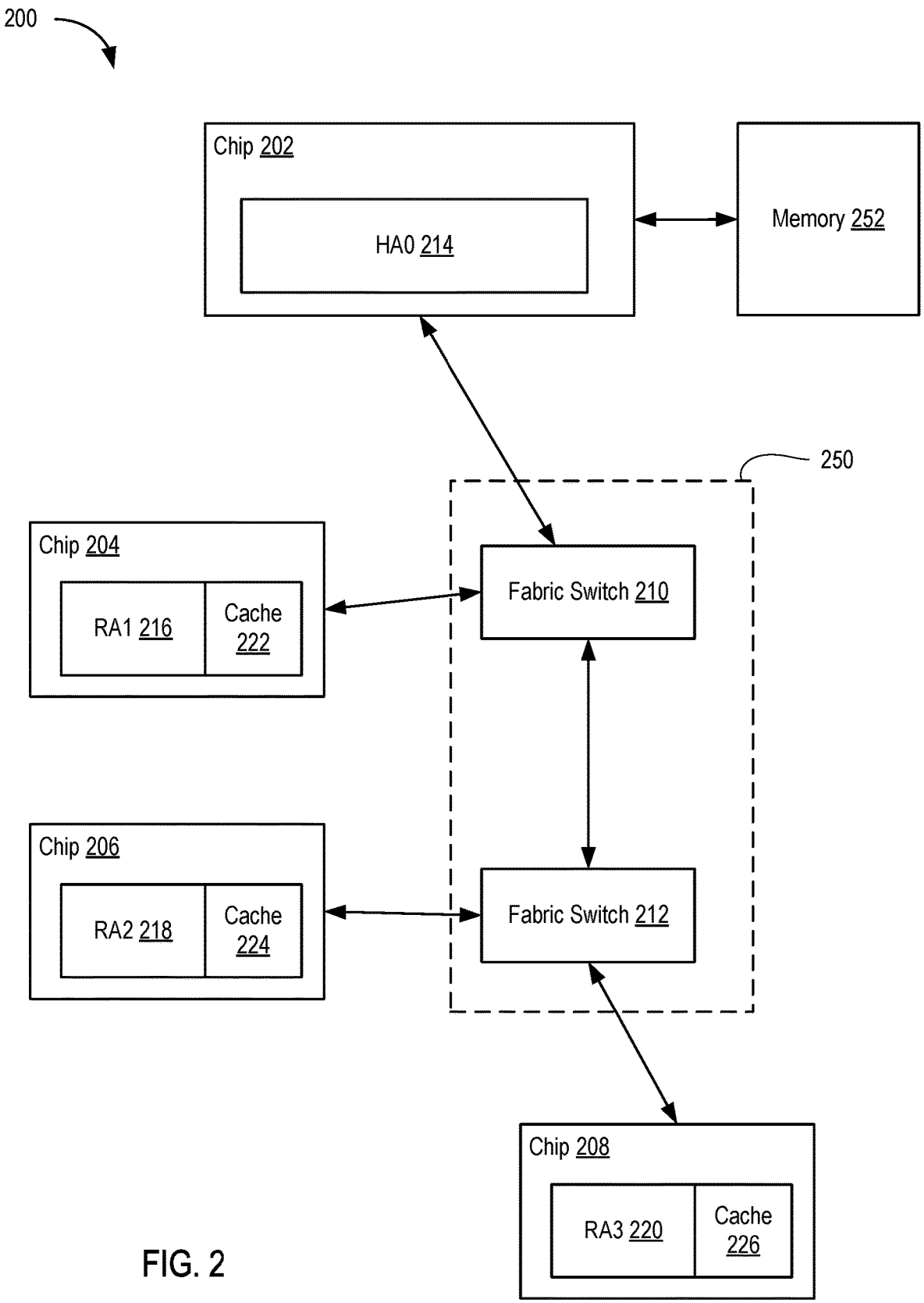
FIG. 2 is a block diagram depicting a cache-coherent packetized network system according to an example.

FIG. 2 is a block diagram depicting a cache-coherent packetized network system 200 according to an example. The cache-coherent packetized network system 200 includes a coherent communication network having a plurality of chips, e.g., chips 202, 204, 206, and 208. The chip 202 includes a home agent 0 (HA0) 214 coupled to a memory 252. The chip 204 includes a request agent 1 (RA1) 216; the chip 206 includes an RA2 218; and the chip 208 includes an RA3 220. In various examples, the request agents are referred to herein as RA1, RA2, or RA3 or more generally by their reference characters 216, 218, and 220. The chip 204 includes a cache memory ("cache 222"); the chip 206 includes a cache 224; and the chip 208 includes a cache 226. The cache-coherent packetized network system 200 also includes a packetized coherent network 250 having fabric switches 210 and 212. In an example, the fabric switch 210 can be integrated with the chip 204. In another example, the fabric switch 212 can be integrated with the chip 206. The techniques described herein are not affected by the location of the fabric switches, whether they are separate components or integrated within another component of the system. Further, the techniques described herein do not rely only on fabric switches for connections between RAs and HAs. In examples, communication protocol techniques other than fabric switches can be used, e.g., ring or daisy chained topologies.

The cache-coherent packetized network system 200 can be implemented in the system 100 described above. For example, the chip 202 can be the microprocessor 112, and the chips 204, 206 and 208 can be programmable devices 128 of different hardware accelerators 122. The fabric switches 210 and 212 are switches in the peripheral bus 115 (e.g., PCIe switches). Although three RAs and two fabric switches are shown, the system 200 can have more than two fabric switches and more or less than three RAs.

The cache-coherent packetized network system 200 supports direct cache-to-cache transfers between request and "snooped" agents in the system. Instead of the data being returned from the snooped agent (SA) to the HA and back to the RA, the data is transferred directly from the SA to the RA. For example, either of RA 216 or RA 218 can be an SA in the system. In various examples, the terms "parent" and "child" are attached to the type of agent to indicate direction of messaging, where a parent sends a request message to a child and a child sends a response message to the parent. Thus, a parent RA sends a request message to a child HA. The child HA can then act as a parent to send a snoop request to a child SA. In some cases, the modifier "parent" or "child" is omitted and the direction of communication can be inferred from the type of messages being exchanged (e.g., requests sent by a parent and received by a child, and responses sent by child and received by a parent).

Some techniques use the following reattachment schemes to bind a parent coherency message with its child messages. Address-based reattachment: for example, a parent request for Address A may spawn subsequent snoops to that Address A and subsequent snoop responses for that Address A. In such case, the parent transaction is the request from the RA to Address A, and the child transaction is the HA using the same Address A as part of its snoop message. In some cache coherency protocols, the RA also uses the observation of the snoop to the same Address A from the HA as an indication of global ordering of its request at that HA. Transaction ID-based reattachment: for example, a parent snoop request for Address A sent by an HA to snooped (Request) Agents may use transaction ID X as part of the parent snoop request packet. The subsequent snoop responses to that Address A also use transaction ID X to allow the HA to reattach the child snoop responses to the parent snoop request to Address A.

What is common about these two particular coherency operations is that they involve one type of parent agent and one or more types of child agents. A request operation (also referred to as a coherent request operation) typically involves a request parent agent and a home child agent. A snoop operation typically involves a home (snooper) parent agent and one or more (snooped) child agents.

Further, consider the number of bits used to express an address. An address for coherent transactions is typically a cacheline aligned 64-bit address. When used as a tag, the address constitutes a 58-bit field in the cache-coherent packet for a 64 byte cacheline. Those skilled in the art appreciate that other values can be used for the address width and field width in the cache-coherent packet. Also consider the number of bits to express a transaction ID. A transaction ID for coherent transactions is typically a function of the outstanding transaction capability of a particular agent. In CCIX, for example, a transaction ID is a 12-bit field. Those skilled in the art will appreciate that other values can be used for the width of the transaction ID.

Modern multi-processor and processor-accelerator systems have also enhanced the coherency protocol with operations such as Direct Cache Transfer and Stashing. These enhanced protocol operations have a common aspect in that they are compound coherency operations, merging multiple individual parent-child operations with the goal of achieving higher performance or more efficient transfers of coherent data. In some cases, the enhanced operation can be described as either a cascaded parent-child-child sequence or a parent-child-(adopting)-parent-child sequence. A Direct Cache Transfer (DCT) operation typically involves a parent RA and a child HA, where the child HA completes a portion of the original request, but also subsequently adopts the role of parent to make a DCT snoop request to a child snooped agent (SA). The child SA then acts on behalf of the HA to participate in the completion of the parent request. A Stash Transfer operation typically involves a parent RA and a child HA, where the child HA completes a portion of the original request, but also subsequently adopts the role of parent to make a Stashing Snoop Request to the stash target child agent. The stash child agent may then choose to respond and complete the parent agent stash request.

Because of the cascaded parent-child-child sequence or parent-child-parent-child sequence, and because of the compound coherency operations, these compound messages end up requiring multiple parent-child reattachment tags. An adoptive parent agent might have to retain the previous parent agent's reattachment tag while adding its own reattachment tag such that the original parent agent's tag is used to complete one subset of the compound operation and the adoptive parent agent's tag is used to complete another subset of the compound operation.

Some techniques, even for these compound coherency operations, continue to utilize the same reattachment schemes to bind a parent coherency message with its child messages. A DCT operation can be performed as follows: The operation begins with a parent RA sending Address A with transaction ID (Txn ID) C to the child HA. The child HA may optionally respond with Txn ID C informing the RA that the response may arrive from an agent other than the HA. The child HA subsequently adopts the role of parent to make a DCT snoop request, also with Address A, to the child SA. The original parent agent request's Txn ID C can be attached, as well as the new adoptive parent's snoop request Txn ID D to the child SA. The child SA then acts on behalf of the HA to directly send data to the parent RA, and reattaches the "tag" (either Address A or Txn ID C) as part of the data transfer so that the parent RA can bind the parent coherent request message with its child data message. The child SA also returns a DCT acceptance response with Txn ID D back to the HA so that the HA can bind the parent coherent snoop message with its child DCT acceptance response message.

A Stash Write operation can be performed as follows: The operation begins with a parent RA sending the operation with Txn ID X to the child HA for Address B. The child HA completes the Stash Write operation to memory at Address B. The HA also acts as the adoptive parent and sends the stashing snoop request for the Address B to the stash target child agent with either the original Txn ID X or a new home agent Txn ID Y. The stash target child agent may choose to respond with one of Txn ID X or Txn ID Y to the HA with acceptance of the stash request to bind the parent HA stash request message for Address B with its child stash acceptance response message. The stash target child agent additionally provides its own Txn ID Z to the HA for Address B. The HA responds to the stash target destination agent with stash data for Address B with Txn ID Z to bind the stash data to the stash target destination agent's data location for Address B.

These techniques have the inherent inefficiency of carrying either the entire address tag binding or multiple Txn ID tag bindings as additional fields due to just extending prior address-based or Txn ID-based binding techniques to the compound coherency operations.

In contrast to the above, the techniques described herein do not rely on carrying the entire original binding, Address or Txn ID, but instead sends a compressed tag that serves the same purpose. The advantages of this technique over others include: more efficient and lower latency messaging for all classes of compound messages across the packetized coherent network; and an implicit tag generation scheme that reuses portions of the parent message to achieve the correct binding to the matching parent, thus continuing to maintain correctness of operation, ordering, hazard detection, and other requirements of a cache coherency protocol.

Figure 3:
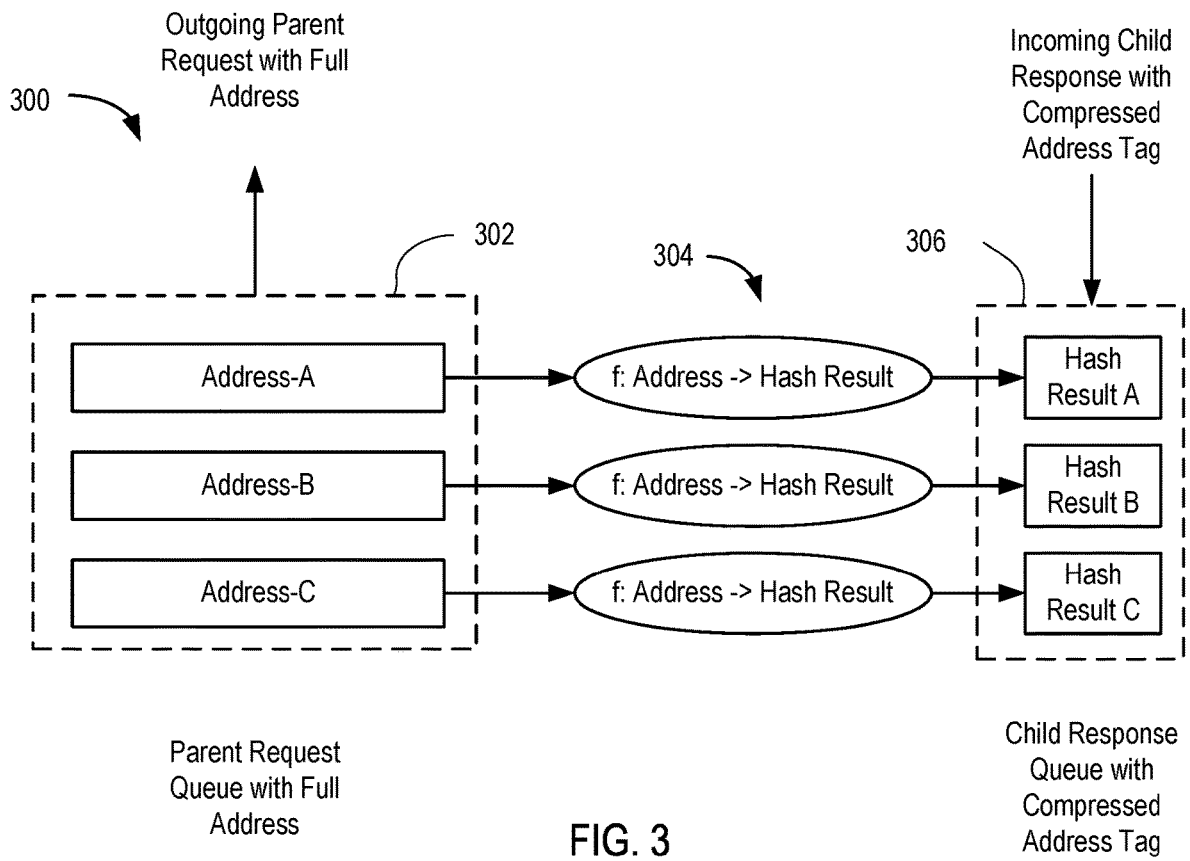
FIG. 3 is a block diagram depicting a common coherency message compression scheme for tagging according to an example.

FIG. 3 is a block diagram depicting a common coherency message compression scheme 300 for tagging according to an example. The parent RA is sending a stream of coherent request messages from queue 302 with addresses A, B, and C to the child HA. For every parent request, the parent RA computes compressed tags A', B', and C' in order to bind the incoming child coherency response messages from the child HA to their corresponding parent request. Addresses A, B, and C are processed through a common compression function 304 to generate hash results A, B, and C that function as compressed tags A', B', and C'. The incoming child response messages include compressed address tags and are stored by the parent RA in a child response queue 306. The compressed tags computed by the parent RA are compared with those received in the child response messages to match request messages with responses message. Based on the implementation and protocol, for example cases where the parent RA acts as a coherent proxy for many accelerator functions behind it, the parent RA may also choose not to retain the full address in its own completion queues, thus also applying the techniques to compress the logic required for the tracking and storing of information to bind the incoming child coherency response messages.

Figure 4:
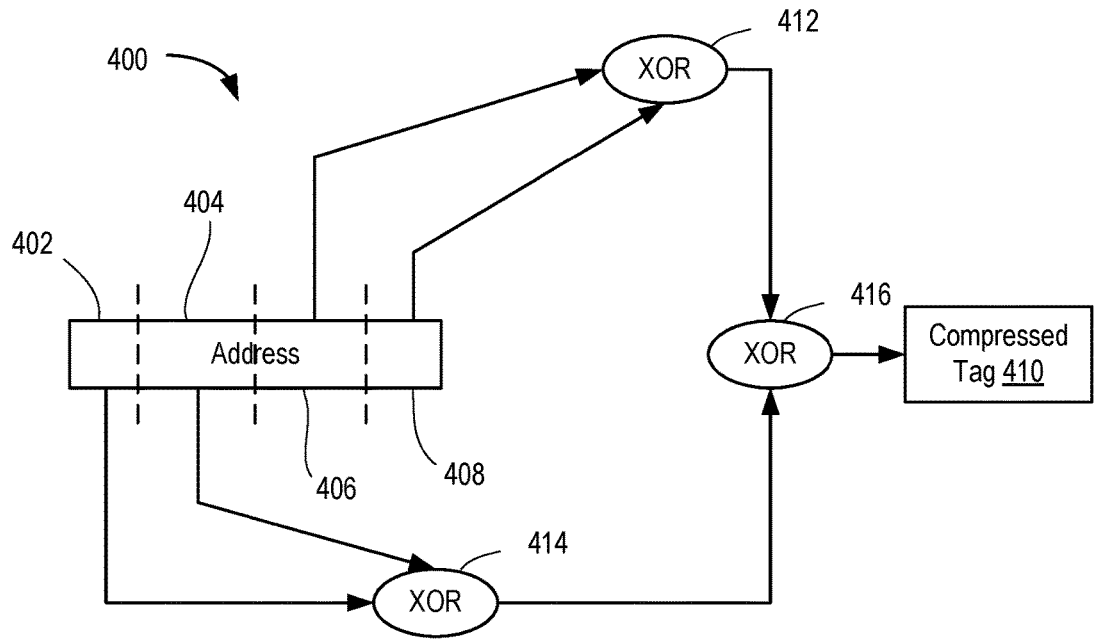
FIG. 4 is a block diagram illustrates a common compression function to generate compressed tags according to an example.

FIG. 4 is a block diagram illustrating a common compression function 400 to generate compressed tags according to an example. The compression function 400 is created such that the compressed hash results A', B', and C' should all be unique in order to prevent the binding of an incoming child coherency response message to the wrong parent request. Since computing systems exhibit spatial locality in their access patterns, the compression function to generate compressed tags ideally generates unique tags for sequential accesses. As shown in FIG. 4, the example compression function involves a bitwise XOR of ranges of ascending order address bits. For example, the address can be divided into four sections 402, 404, 406, and 408 as shown, where bits 402 are the most significant bits and bits 408 are the least significant bits and the bits ascend from 408 to 406 to 404 to 402. Bits 406 are XOR'd with bits 408 by XOR function 412. Bits 402 are XOR'd with bits 404 by XOR function 414. The outputs of XORs 412 and 414 are XOR'd by XOR function 416 to generate a compressed tag 410. As a result, sequential lower order address bits that are bitwise XORed with higher order address bits will generate unique hash results.

Figure 5:
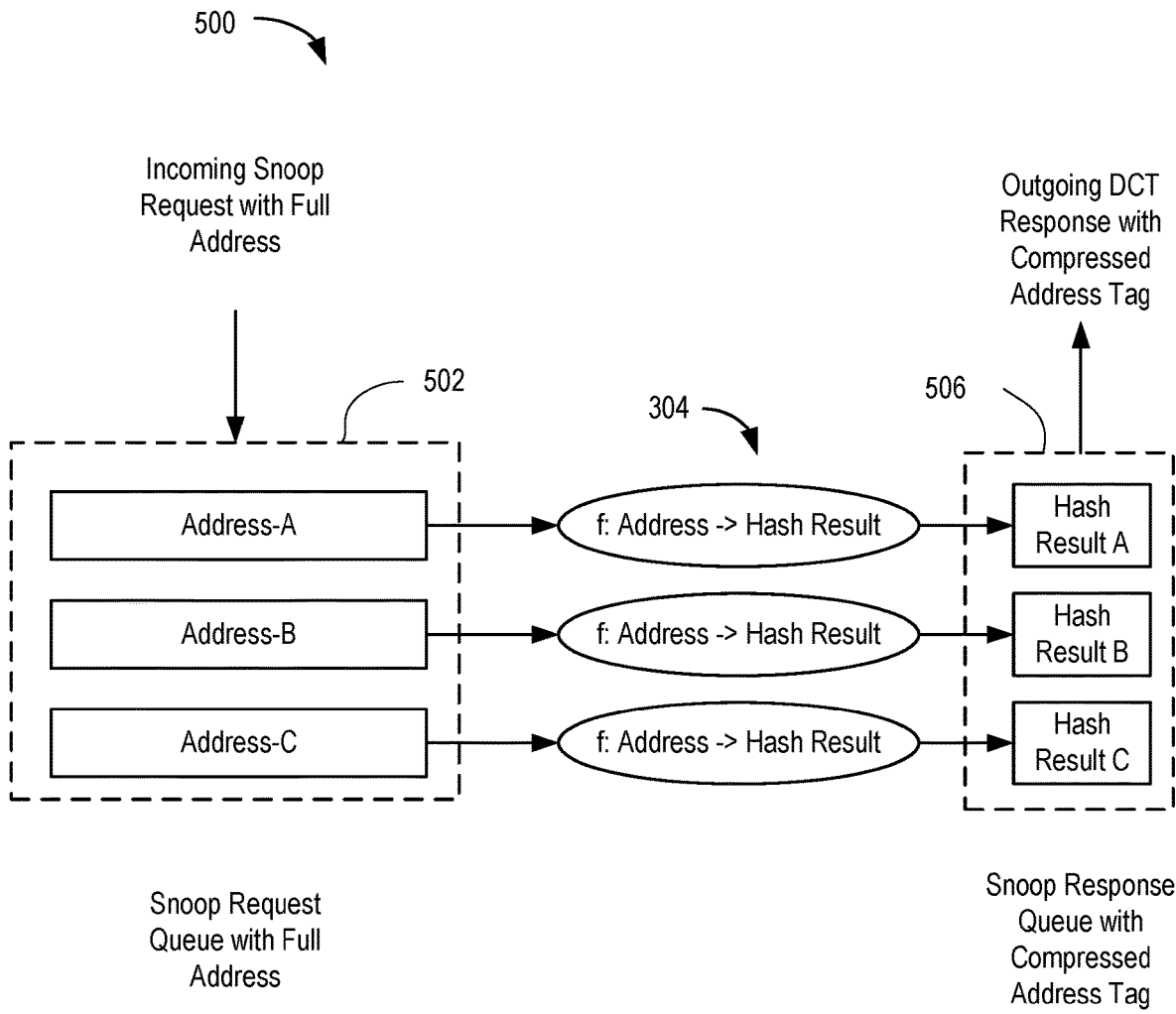
FIG. 5 is a block diagram depicting operation at the child snooped agent according to an example.

FIG. 5 is a block diagram depicting operation at the child SA according to an example. The child SA is receiving a stream of coherent snoop request messages in queue 502 with addresses A, B, and C. For every snoop request, the child SA computes compressed tags A', B', and C' using the common function 304 in order to include those tags as part of the child coherency response messages. Addresses A, B, and C are processed using the same compression function 304 to generate compressed tags A', B', and C' as the original parent RA. The hash results are appended as compressed tags to the response messages in response queue 506 of the child SA.

As described above, the pending coherency messages must all have unique compressed tags to prevent the binding of an incoming child coherency response messages to the wrong parent request. This also requires that the techniques comprehend that the compression function for a new, different address can possibly generate a non-unique compressed tag, even if the new request address is unique. This is illustrated in FIG. 6, where the new request D has the common compression function performed in order to generate compressed tag D'.

Figure 6:
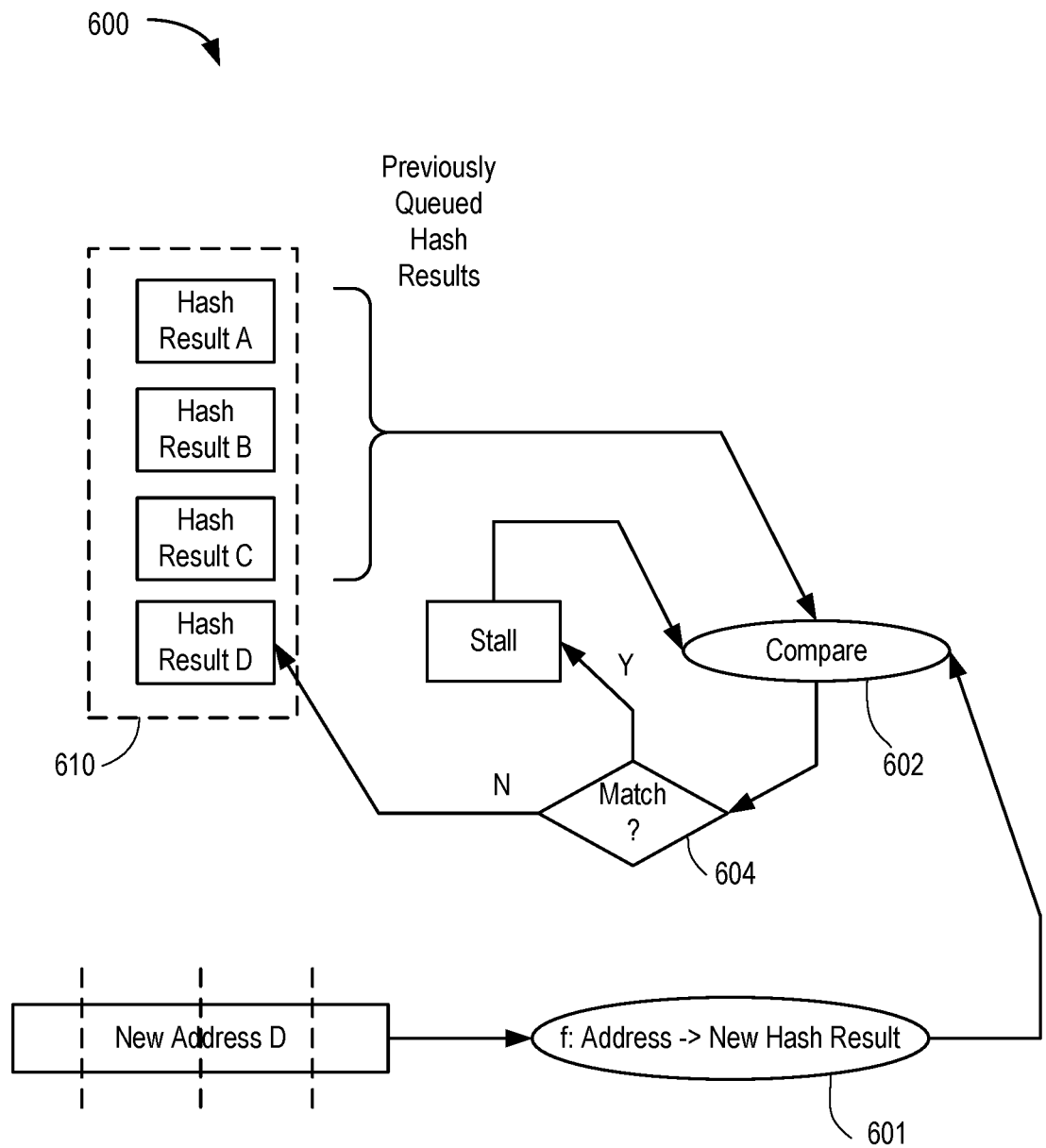
FIG. 6 is a block diagram depicting the compression function for a new, different address can possibly generate a non-unique compressed tag, even if the new request address is unique.

FIG. 6 is a block diagram depicting a method 600 of handling duplicate compressed tags for different addresses according to an example. New address D is processed through a hash function 601 to generate a compressed tag D'. Tag D' is compared (step 602) against all outstanding parent request message's compressed tags A', B', and C'. If there is a match (step 604), the parent request D is stalled (step 606) until there is no match. If there is no match (604), parent request D is issued and the corresponding compressed tag D' is stored for binding back to the parent request in the incoming child response queue 610. The nature of cache coherent packetized protocols is that multiple outstanding coherent requests to the same address are typically disallowed. Thus, even though a common compression function of the same address X is guaranteed to result in the same compressed tag X', a coherency protocol would disallow multiple parent requests to X. Thus, the scenario of multiple child response messages with compressed tag X is inherently avoided in typical cache coherent packetized protocols, thus making the techniques described herein universally applicable.

Figure 7:
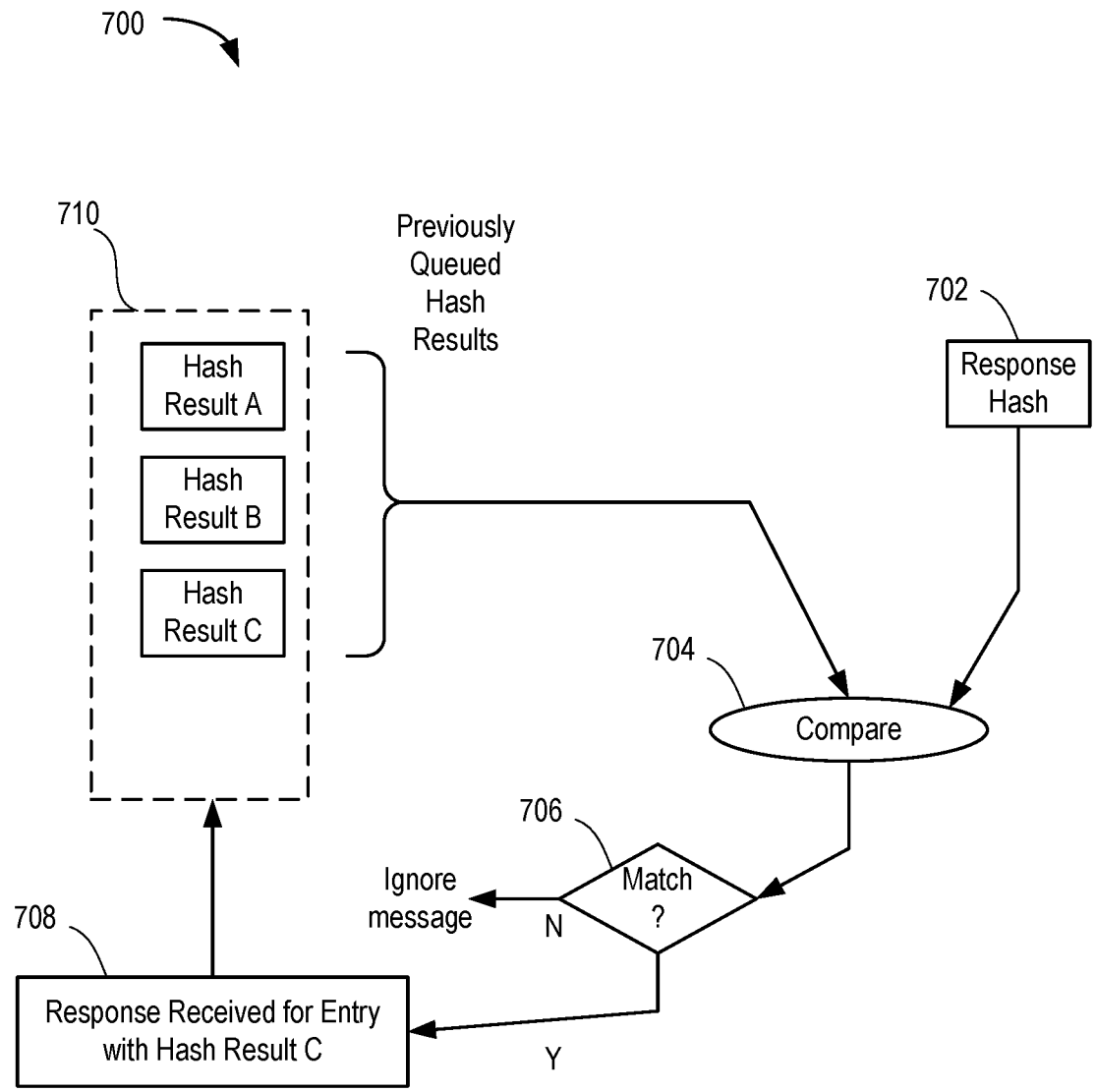
FIG. 7 illustrates operation of incoming coherency response messages with unique compressed tags and the binding of these incoming child coherency response messages to their corresponding parent request.

FIG. 7 illustrates operation 700 of incoming coherency response messages with unique compressed tags and the binding of these incoming child coherency response messages to their corresponding parent request according to an example. Incoming child response 702 contains a compressed tag C'. The compressed tag C' is then compared (step 704) against all outstanding parent request message's compressed tags A', B', and C'. If there is a match (706), the parent RA recognizes the incoming child response as belonging to it (step 708) and performs the resultant coherency action based on the contents of the child coherency response message with tag C' in the queue 710. The parent RA ignores the incoming child message at step 706 if there is no match.

Figure 8:
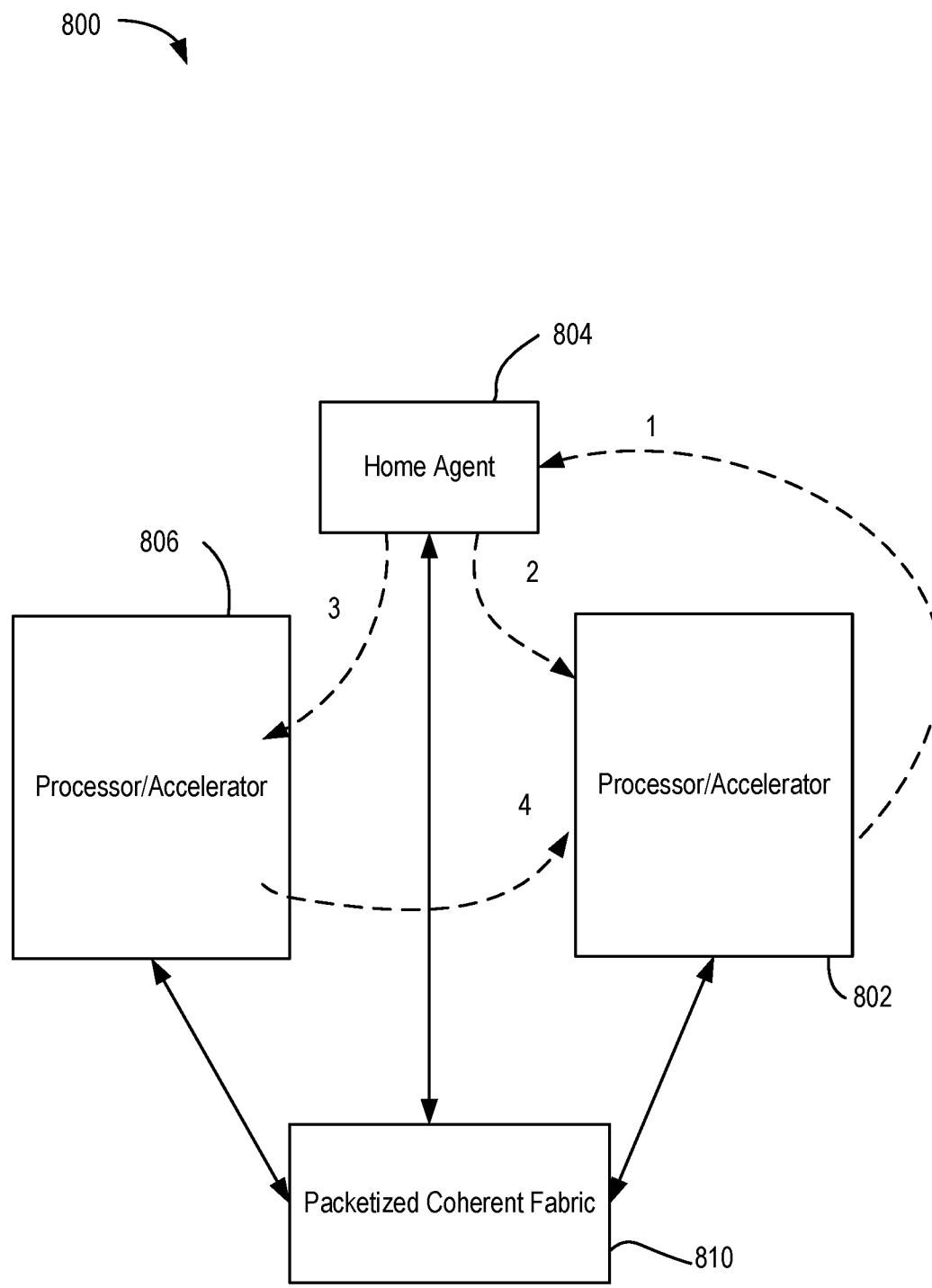
FIG. 8 is a block diagram depicting operation for the direct cache transfer coherency protocol according to an example.

FIG. 8 is a block diagram depicting operation 800 for the direct cache transfer coherency protocol according to an example. The direct cache transfer operation proceeds as follows: 1. Begins with a parent RA 802 (e.g., a processor or accelerator) sending address A with Txn ID C to a child HA 804. 2. The child HA 804 may optionally respond with Txn ID C informing the RA 802 that the response may arrive from an agent other than the HA 804. 3. The child HA 804 subsequently adopts the role of parent to make a DCT snoop request, also with address A, to a child SA 806 (e.g., a processor or accelerator). This time however, the child HA 804, unlike prior techniques, need not also include the Txn ID C and need only include its own Txn ID D as part of the adopted parent DCT snoop request. This is because all parent/child agents participate in the common compressed tag and parent-child binding scheme of the techniques described herein. 4. The child SA 806 then acts on behalf of the HA 804 to directly send data to the parent RA 802. This time however, the child SA 806, unlike prior techniques, need not also include the Txn ID C and just generates a compressed tag A' so that the RA 802 can bind the parent coherent request message A with its child data message with Tag A'. The child SA 806 can also return a DCT acceptance response with tag A' (not shown in the figure) back to the HA 804 so that the HA 804 can bind the parent coherent snoop message for address A with its child DCT acceptance response message. The RA 802, HA 804, and SA 806 communicate through a packetized coherent fabric 808, as described above (e.g., FIG. 2). The various operations discussed above are summarized in FIG. 10 below.

Figure 10:
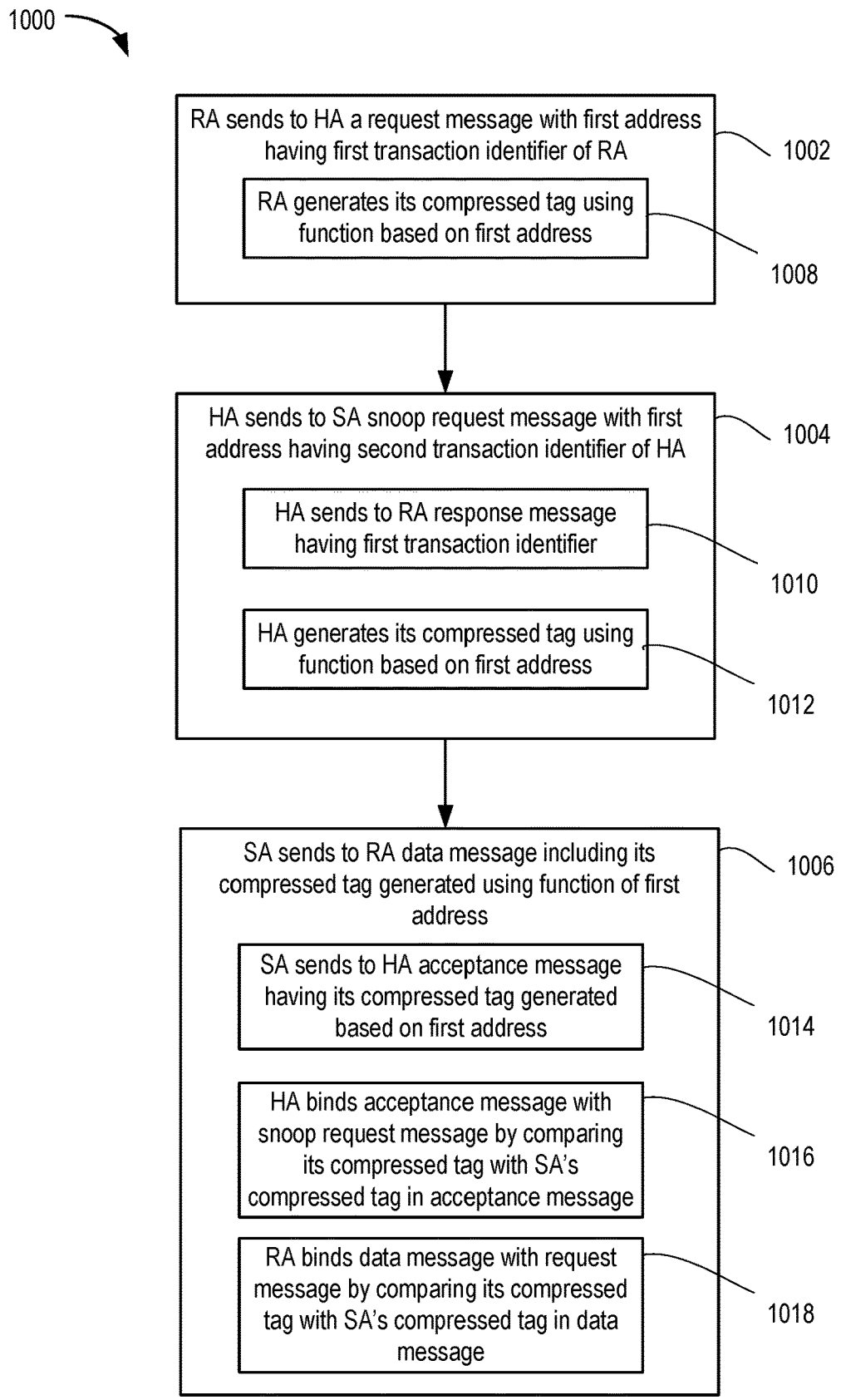
FIG. 10 is a method of a coherency protocol according to an example.

FIG. 10 is a method 1000 of a coherency protocol according to an example. The method 1000 begins at step 1002, where the RA sends to the HA a request message for data with a first address. The request message has a first transaction identifier corresponding to the RA. At step 1008, the RA generates its compressed tag using the common function based on the first address. The RA's compressed tag will be used to bind the request message to the subsequent data message.

At step 1004, the HA sends to an SA a snoop request message for the data with the first address. The snoop request message has a second transaction identifier corresponding to the HA. At step 1010, the HA can send to the RA a response message having the first transaction identifier indicating that the request for data was received and that the data will arrive from another agent. At step 1012, the HA generates its compressed tag using the common function based on the first address. The HA's compressed tag will be used to bind an acceptance message from the SA to the snoop request.

At step 1006, the SA sends to the RA a data message. The data message includes the requested data and the SA's compressed tag generated using the common function based on the first address. At step 1014, the SA can send to the HA an acceptance message having its compressed tag generated based on the first address. At step 1016, the HA binds the acceptance message with the snoop request by comparing its compressed tags with the SA's compressed tag in the acceptance message. At step 1018, the RA binds the data message with the request message by comparing its compressed tags with the SA's compressed tag provided in the data message.

Figure 11:
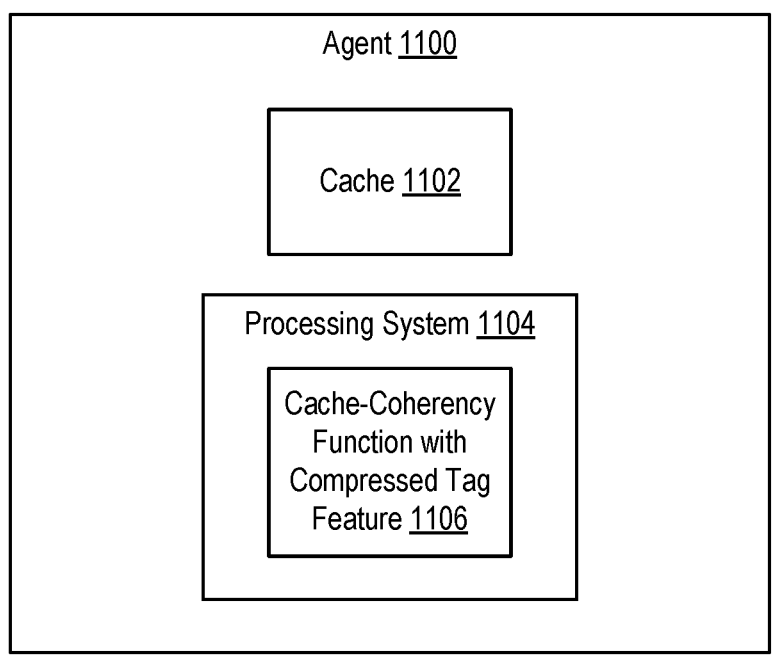
FIG. 11 is a block diagram depicting an agent according to an example.

FIG. 11 is a block diagram depicting an agent 1100 according to an example. The agent 1100 can be an HA, RA, SA, etc. The agent 1100 includes a cache 1102 and a processing system 1104. The processing system 1104 can be a host computer having a processor, memory, software platform, etc. Alternatively, the processing system 1104 can be a hardware accelerator. In either case, the processing system 1104 includes a cache-coherency function with the compressed tag feature described above. Thus, the agent 1100 is configured to send request messages, acceptance messages, data messages, etc. according to the particular cache-coherency protocol. The agent 1100 is configured to generate compressed tags from addresses using a common function. The agent 1100 is configured to embed the compressed tags in response messages to that the requesting agents can bind the response messages to the proper request messages. Thus, the agent 1100 can perform any of the operations and methods described above with respect to an HA, RA, and SA.

Figure 9A:
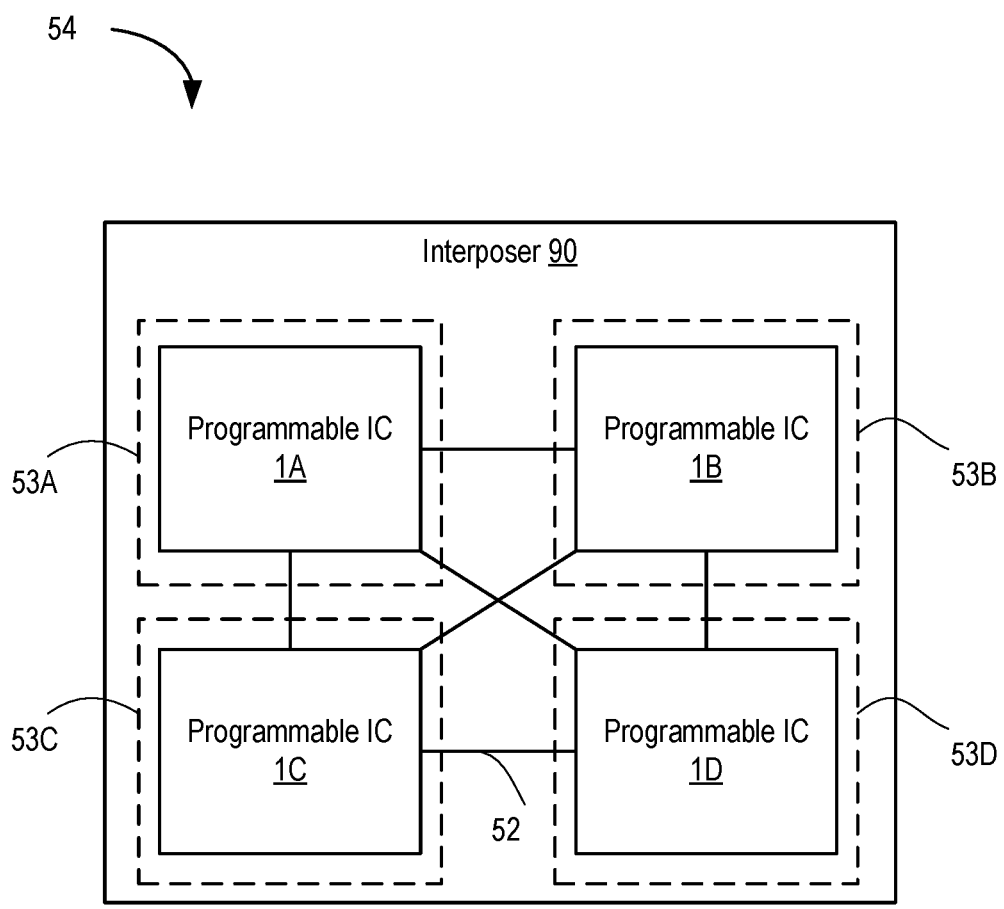
FIG. 9A is a block diagram depicting a multi-integrated circuit (IC) programmable device according to an example.

FIG. 9A is a block diagram depicting a programmable device 54 according to an example. The programmable device 54 can be used to implement the programmable device 128 in the hardware accelerator 122. The programmable device 54 includes a plurality of programmable integrated circuits (ICs) 1, e.g., programmable ICs 1A, 1B, 1C, and 1D. In an example, each programmable IC 1 is an IC die disposed on an interposer 90. Each programmable IC 1 comprises a super logic region (SLR) 53 of the programmable device 54, e.g., SLRs 53A, 53B, 53C, and 53D. The programmable ICs 1 are interconnected through conductors on the interposer 90 (referred to as super long lines (SLLs) 52).

Figure 9B:
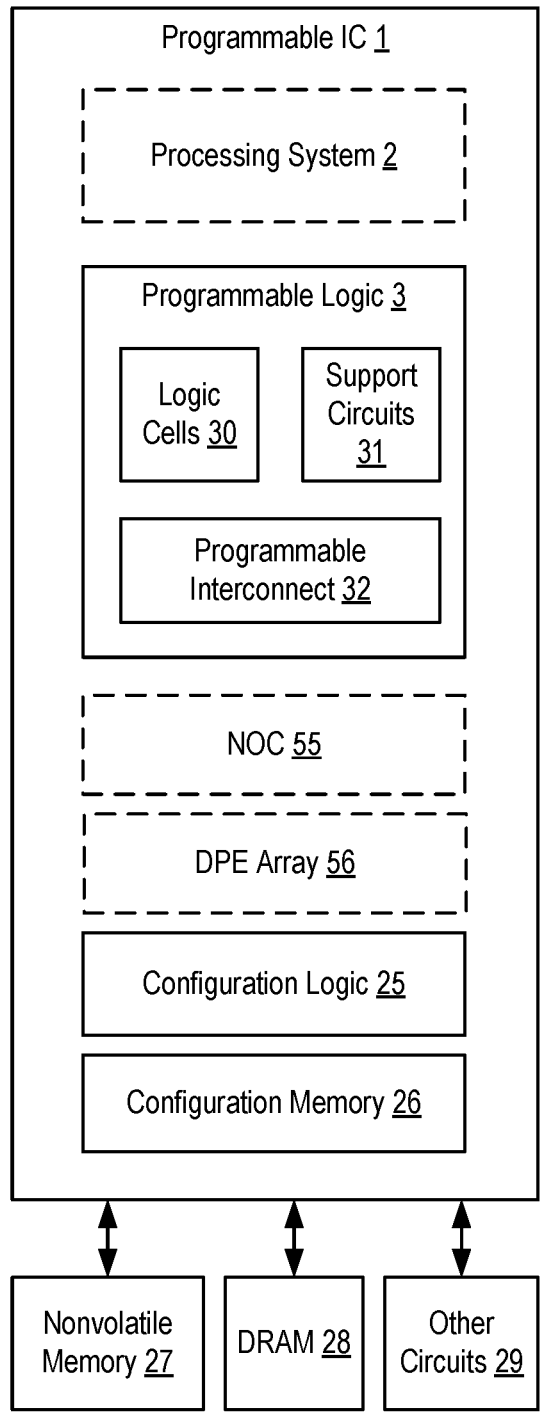
FIG. 9B is a block diagram depicting a programmable IC according to an example.

FIG. 9B is a block diagram depicting a programmable IC 1 according to an example. The programmable IC 1 can be used to implement the programmable device 128 or one of the programmable ICs 9A-9D in the programmable device 54. The programmable IC 1 includes programmable logic 3

(also referred to as a programmable fabric), configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system 2. The processing system 2 can include microprocessor(s), memory, support circuits, IO circuits, and the like. In some examples, the programmable IC 1 includes a network-on-chip (NOC) 55 and data processing engine (DPE) array 56. The NOC 55 is configured to provide for communication between subsystems of the programmable IC 1, such as between the PS 2, the PL 3, and the DPE array 56. The DPE array 56 can include an array of DPE's configured to perform data processing, such as an array of vector processors.

Figure 9C:
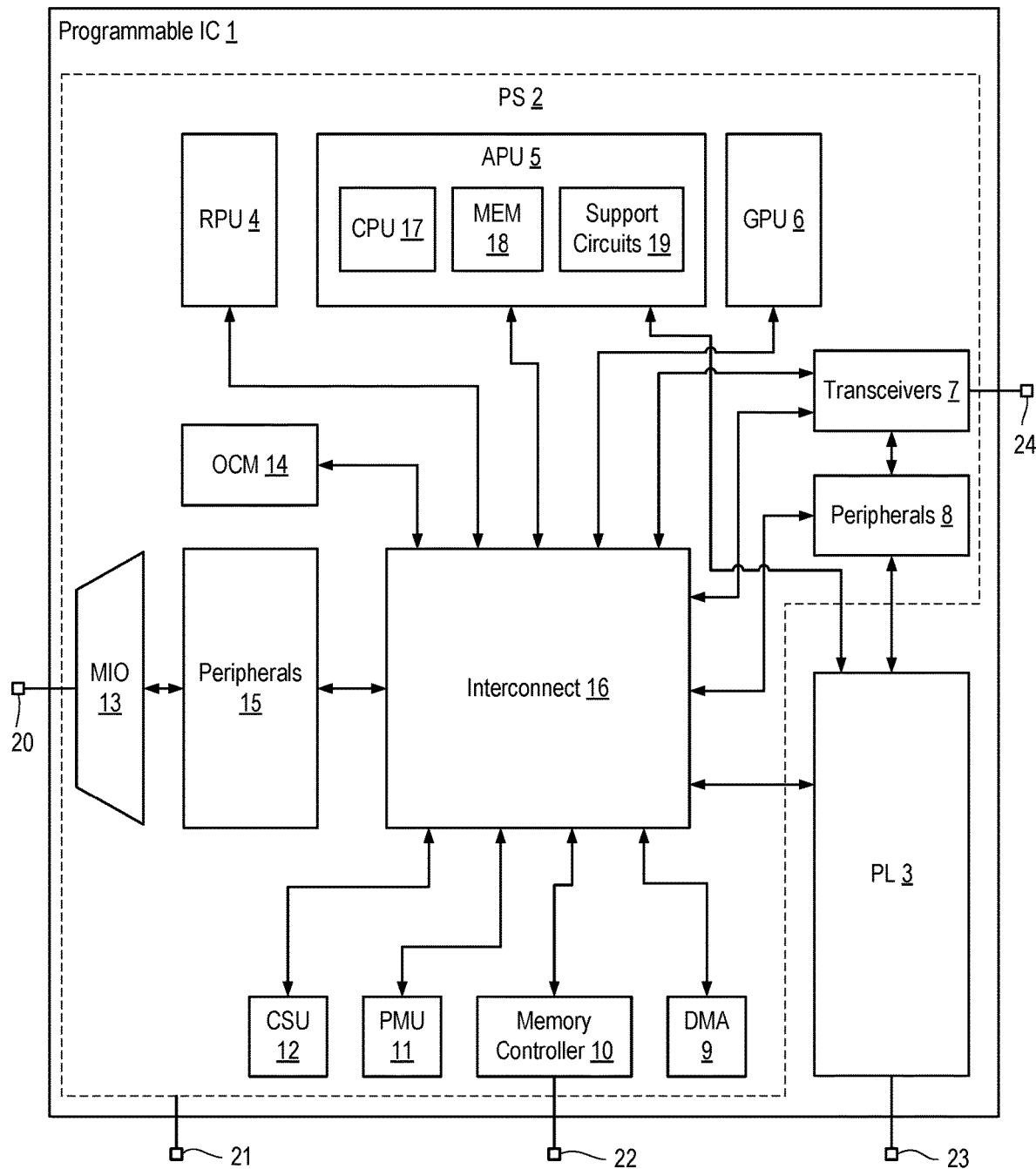
FIG. 9C is a block diagram depicting a System-on-Chip (SOC) implementation of a programmable IC according to an example.

FIG. 9C is a block diagram depicting an SOC implementation of the programmable IC 1 according to an example. In the example, the programmable IC 1 includes the processing system 2 and the programmable logic 3. The processing system 2 includes various processing units, such as a real-time processing unit (RPU) 04, an application processing unit (APU) 5, a graphics processing unit (GPU) 6, a configuration and security unit (CSU) 12, a platform management unit (PMU) 11, and the like. The processing system 2 also includes various support circuits, such as on-chip memory (OCM) 14, transceivers 7, peripherals 8, interconnect 16, DMA circuit 9, memory controller 10, peripherals 15, and multiplexed 10 (MIO) circuit 13. The processing units and the support circuits are interconnected by the interconnect 16. The PL 3 is also coupled to the interconnect 16. The transceivers 7 are coupled to external pins 24. The PL 3 is coupled to external pins 23. The memory controller 10 is coupled to external pins 22. The MIO 13 is coupled to external pins 20. The PS 2 is generally coupled to external pins 21. The APU 5 can include a CPU 17, memory 18, and support circuits 19.

In the example of FIG. 9C, the programmable IC 1 can be used in the hardware accelerator 122 and can function as described above. The acceleration circuit 130 can be programmed in the PL 3 and function as described above. In another example, the functionality of the hardware 104 described above can be implemented using the PS 2, rather than through hardware of a computing system. In such case, the software 106 executes on the PS 2 and functions as described above.

Referring to the PS 2, each of the processing units includes one or more central processing units (CPUs) and associated circuits, such as memories, interrupt controllers, direct memory access (DMA) controllers, memory management units (MMUs), floating point units (FPUs), and the like. The interconnect 16 includes various switches, busses, communication links, and the like configured to interconnect the processing units, as well as interconnect the other components in the PS 2 to the processing units.

The OCM 14 includes one or more RAM modules, which can be distributed throughout the PS 2. For example, the OCM 14 can include battery backed RAM (BBRAM), tightly coupled memory (TCM), and the like. The memory controller 10 can include a DRAM interface for accessing external DRAM. The peripherals 8, 15 can include one or more components that provide an interface to the PS 2. For example, the peripherals 15 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose IO (GPIO) ports, serial advanced technology attachment (SATA) ports, PCIe ports, and the like. The peripherals 15 can be coupled to the MIO 13. The peripherals 8 can be coupled to the transceivers 7. The transceivers 7 can include serializer/deserializer (SERDES) circuits, multi-gigabit transceivers (MGTs), and the like.

Figure 9D:
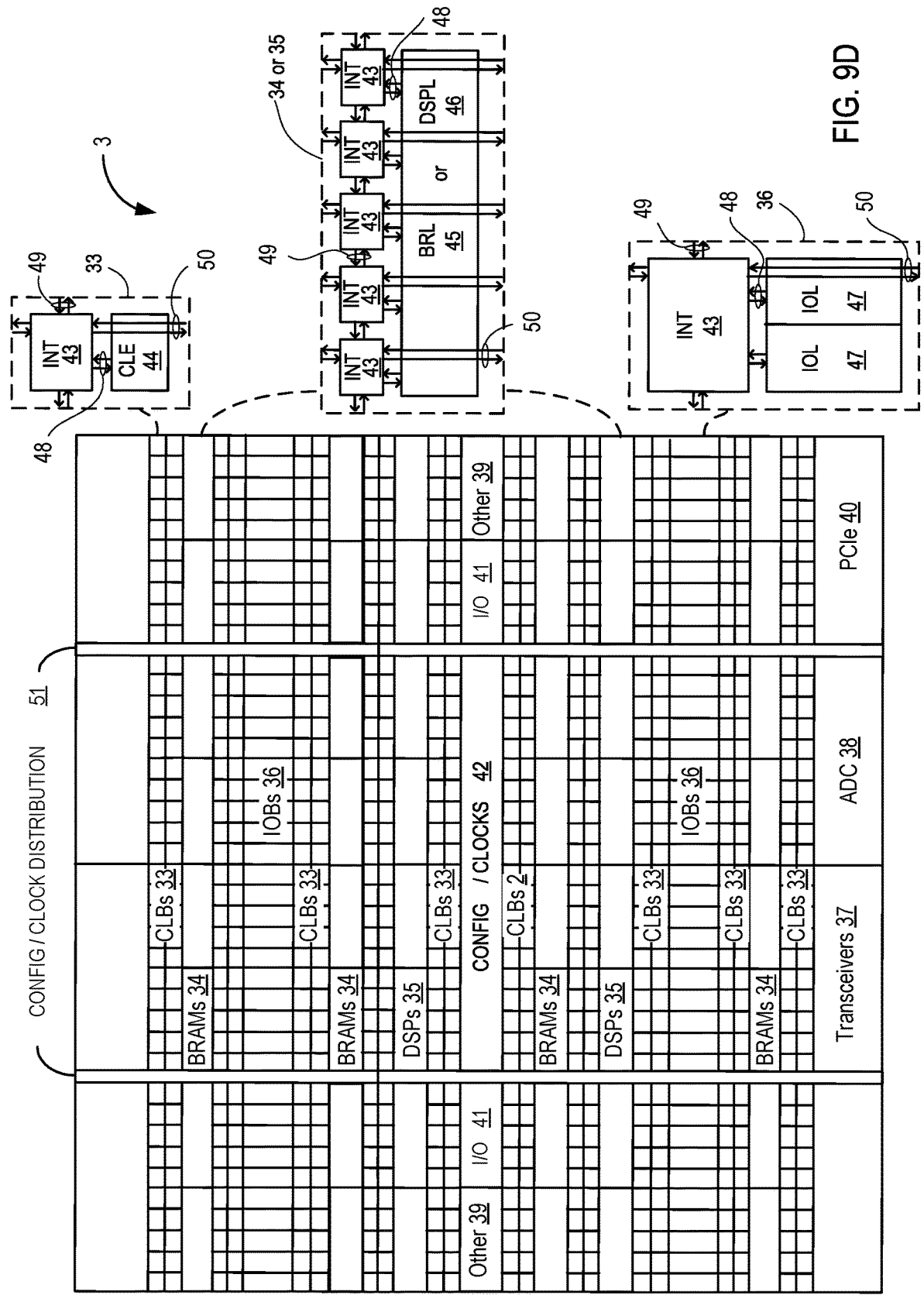
FIG. 9D illustrates a field programmable gate array (FPGA) implementation of a programmable IC according to an example.

FIG. 9D illustrates a field programmable gate array (FPGA) implementation of the programmable IC 1 that includes the PL 3. The PL 3 shown in FIG. 9D can be used in any example of the programmable devices described herein. The PL 3 includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("VO") 41 (e.g., configuration ports and clock ports), and other programmable logic 39 such as digital clock managers, analog-to-digital converters, system monitoring logic, and so forth. The PL 3 can also include PCIe interfaces 40, analog-to-digital converters (ADC) 38, and the like.

In some PLs, each programmable tile can include at least one programmable interconnect element ("INT") 43 having connections to input and output terminals 48 of a programmable logic element within the same tile, as shown by examples included at the top of FIG. 5D. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated PL.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 5D) is used for configuration, clock, and other control logic. Vertical columns 51 extending from this horizontal area or column are used to distribute the clocks and configuration signals across the breadth of the PL.

Some PLs utilizing the architecture illustrated in FIG. 9D include additional logic blocks that disrupt the regular columnar structure making up a large part of the PL. The additional logic blocks can be programmable blocks and/or dedicated logic. Note that FIG. 9D is intended to illustrate only an exemplary PL architecture. For example, the numbers of logic blocks in a row, the relative width of the rows, the number and order of rows, the types of logic blocks included in the rows, the relative sizes of the logic blocks, and the interconnect/logic implementations included at the top of FIG. 9D are purely exemplary. For example, in an actual PL more than one adjacent row of CLBs is typically included wherever the CLBs appear, to facilitate the efficient implementation of user logic, but the number of adjacent CLB rows varies with the overall size of the PL.

The compressed tag techniques described herein reduce the number of bits required for the parent request messages to bind their corresponding coherent child messages. As a result, the techniques reduce the number of packet flits constituting a coherent child message packet, and thus reduce the latency of communicating a particular message, as well as reduce the aggregate latency of messages for back-to-back child messages across a transport. With a lower aggregate latency, the aggregate performance of a cache coherent packetized network increases.

While the foregoing is directed to specific examples, other and further examples may be devised without departing from the basic scope thereof, and the scope thereof is determined by the claims that follow.

What is claimed is:

1. A cache-coherent packetized network system, comprising:
    a home agent;
    a snooped agent; and
    a request agent configured to send, to the home agent, a request message with a first address, the request message having a first transaction identifier of the request agent;
    where the home agent is configured to send, to the snooped agent, a snoop request message with the first address, the snoop request message having a second transaction identifier of the home agent; and
    where the snooped agent is configured to send a data message to the request agent, the data message including a first compressed tag generated using a function based on the first address.

2. The cache-coherent packetized network system of claim 1, wherein the home agent is further configured to send a response message to the request agent, the response message having the first transaction identifier.

3. The cache-coherent packetized network system of claim 1, wherein the request agent is further configured to generate a second compressed tag using the function based on a second address.

4. The cache-coherent packetized network system of claim 3, wherein the request agent is configured to bind the request message with the data message by comparing the first and second compressed tags.

5. The cache-coherent packetized network system of claim 1, wherein the snooped agent is configured to send, to the home agent, an acceptance message having the first compressed tag, and wherein the home agent is further configured to generate a third compressed tag using the function based on the first address.

6. The cache-coherent packetized network system of claim 5, wherein the home agent is configured to bind the acceptance message with the snoop request message by comparing the first and third compressed tags.

7. The cache-coherent packetized network system of claim 1, wherein the function comprises a bitwise XOR of ranges of ascending order bits of the first address.

8. A method in a cache-coherent packetized network system, comprising:
    sending, from a request agent to a home agent, a request message with a first address, the request message having a first transaction identifier of the request agent;
    sending, from the home agent to a snooped agent, a snoop request message with the first address, the snoop request message having a second transaction identifier of the home agent; and
    sending, from the snooped agent to the request agent, a data message, the data message including a first compressed tag generated using a function based on the first address.

9. The method of claim 8, wherein the home agent is further configured to send a response message to the request agent, the response message having the first transaction identifier.

10. The method of claim 8, wherein the request agent is further configured to generate a second compressed tag using the function based on a second address.

11. The method of claim 10, wherein the request agent is configured to bind the request message with the data message by comparing the first and second compressed tags.

12. The method of claim 8, wherein the snooped agent is configured to send, to the home agent, an acceptance message having the first compressed tag, and wherein the home agent is further configured to generate a third compressed tag using the function based on the first address.

13. The method of claim 12, wherein the home agent is configured to bind the acceptance message with the snoop request message by comparing the first and third compressed tags.

14. The method of claim 8, wherein the function comprises a bitwise XOR of ranges of ascending order bits of the first address.

15. An agent in a cache-coherent packetized network system, the agent comprising:
    a cache memory storing data; and
    a processing system, coupled to the cache memory, the processing system configured to:
        send request messages to one or more external agents, each request message having an address associated with data and a transaction identifier of the agent;
        generate local compressed tags using a function from the addresses in the request messages; and bind received messages with the corresponding request messages by comparing compressed tags in the received messages with the local compressed tags.

16. The agent of claim 15, wherein the request messages include request messages for data.

17. The agent of claim 15, wherein the request messages include snoop request messages.

18. The agent of claim 15, wherein the received messages include data messages having data for the request messages.

19. The agent of claim 15, wherein the received messages include acceptance messages generated in response to the request messages.

20. The agent of claim 15, wherein the function comprises a bitwise XOR of ranges of ascending order bits of an input address.

* * * * *